United States Patent Office 3,143,569
Patented Aug. 4, 1964

3,143,569
ETHYLENICALLY UNSATURATED AROMATIC PHOSPHORUS HALIDES
John G. Abramo, Wilmington, Del., Earl C. Chapin, Springfield, Mass., and Albert Y. Garner, Yellow Springs, Ohio, assignors to Monsanto Company, St. Louis, Mo., a corporation of Delaware
No Drawing. Filed Sept. 6, 1963, Ser. No. 306,994
4 Claims. (Cl. 260—543)

This invention is a continuation in part of that claimed in copending application S.N. 15,278, filed March 16, 1960, now abandoned, and relates to novel ethylenically unsaturated aromatic phosphorus compounds. More particularly it relates to novel ethylenically unsaturated aromatic phosphorus acid halides.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing vinylidene monomers.

Another object is the provision of novel vinylidene aromatic monomers containing phosphorus acid halide groups and a process for their manufacture.

A further object is the provision of novel flame-resistant polymers containing reactive halogen groups.

These and other objects are attained by contacting an inorganic acid halide with an ethylenically unsaturated aromatic phosphorus compound, of a class as hereinafter described, at a temperature of from 0 to 120° C.

The following examples are presented in illustration of the invention and are not intended as limitations thereof.

Example I

Thirty-eight grams (about 0.2 mol) of para-vinyl benzyl-phosphonic acid, which has a structural formula corresponding to:

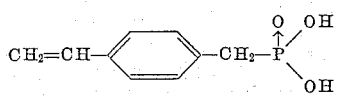

and 84 grams (about 0.4 mol) phosphorus pentachloride are charged to an open reactor at room temperature. Substantially anhydrous reactants are employed. The mixture is stirred at room temperature until the evolution of HCl slows, after which the temperature is increased to about 50° C. and is maintained thereat until the evolution of HCl ceases. The final reaction mixture is distilled to remove the phosphorus oxychloride formed as well as any residual HCl. Subsequent vacuum distillation of the reaction mixture yields a viscous fluid which is identified by infrared spectroscopy and elemental analysis as para-vinyl benzylphosphonyl chloride.

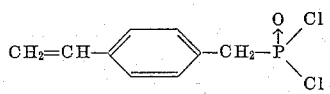

Example II

Example I is repeated, substituting 51 grams (about 0.2 mol) of the diethyl ester of para-vinyl benzylphosphonic acid, which has a structural formula corresponding to:

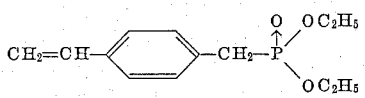

for the para-vinyl benzylphosphonic acid employed therein. The product is again para-vinyl benzylphosphonyl chloride.

Example III

Example I is repeated, substituting 40 grams (about 0.2 mol) of the monoethyl ester of para-vinyl benzylphosphonic acid, which has a structural formula corresponding to:

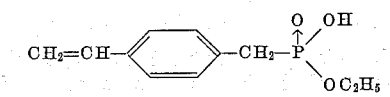

for the para-vinyl benzylphosphonic acid employed therein. The product is again para-vinyl benzylphosphonyl chloride.

Example IV

Thirty-eight grams (about 0.2 mol) of para-vinyl benzylphosphonic acid and 48 grams (about 0.4 mol) of thionyl chloride are charged to an open reactor at room temperature. Substantially anhydrous reactants are employed. The mixture is stirred at about room temperature until the evolution of gases slows, after which the temperature is increased to about 50° C. and maintained substantially thereat, amid stirring, until the evolution of gases ceases. Vacuum distillation of the reaction mixture yields a viscous fluid which is identified by infrared spectroscopy and elemental analysis as para-vinyl benzylphosphonyl chloride.

Example V

Thirty-seven grams (about 0.2 mol) of para-isopropenyl benzyl methylphosphonic acid, which has a structural formula corresponding to:

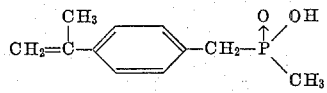

and 40 grams (about 0.2 mol) of thionyl bromide are charged to an open reactor together with 10 grams (about 0.1 mol) of sodium carbonate. Substantially anhydrous reactants are employed. The mixture is heated to about 100° C. and maintained substantially thereat, amid stirring, for about 2 hours. Salts are removed from the final reaction mixture by filtration. The filtrate is subsequently vacuum distilled to yield a viscous fluid which is identified by infrared spectroscopy and elemental analysis as para-isopropenyl benzyl methylphosphinyl bromide.

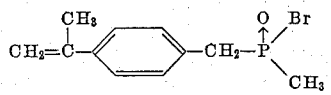

Example VI

Thirty-four grams (about 0.1 mol) of the ethyl ester of P - phenyl - P - (4-vinyl-naphthyl-1-methyl)phosphinic acid, which has a structural formula corresponding to:

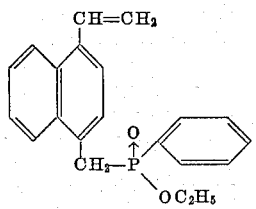

and 21 grams (about 0.1 mol) of phosphorus pentachloride are charged to an open reactor together with 5 grams (about 0.05 mol) of sodium carbonate. Substantially anhydrous reactants are employed. The mixture is heated to about 120° C. and maintained substantially thereat, amid stirring, for about 3 hours. The final reaction mixture is taken up in 100 ml. of hot (ca. 50° C.) acetone and filtered to remove insoluble salts. The hot filtrate is then cooled to precipitate crystalline solids which are identified by infrared spectroscopy and elemental analysis as P-phenyl-P-(4-vinyl-naphthyl-1-methyl) phosphinyl chloride.

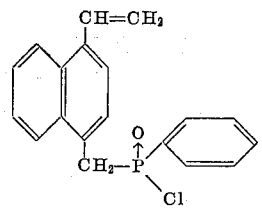

The ethylenically unsaturated aromatic phosphorus compounds employed in the practice of this invention correspond to the general formula:

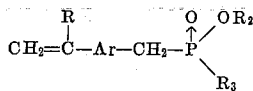

In this formula, R may be either hydrogen or a methyl radical, Ar is a divalent aromatic residue containing from 6 to 14 carbon atoms, $R_2$ may be either hydrogen or a hydrocarbon radical containing from 1 to 20 carbon atoms, and $R_3$ may be either an independently selected $OR_2$ radical or a hydrocarbon radical containing from 1 to 20 carbon atoms.

Therefore, the para-vinyl benzylphosphonic acid, the diethyl ester of para-vinyl benzylphosphonic acid, the monoethyl ester of para-vinyl benzylphosphonic acid, the para-isopropenyl benzyl methylphosphinic acid and the ethyl ester of P-phenyl-P-(4-vinyl-naphthyl-1-methyl) phosphinic acid employed in the examples may be replaced, for example, with one of the following, with equivalent results:

(1) An ethylenically unsaturated aromatic phosphonic acid such as ortho-vinyl benzylphosphonic acid, meta-isopropenyl benzylphosphonic acid, P-(4-vinyl-naphthyl-1-methyl)-phosphonic acid, P-(7-isopropenyl-naphthyl-1-methyl)phosphonic acid, P-(10-vinyl-anthracyl-9-methyl) phosphonic acid, etc.;

(2) A monoester of an ethylenically unsaturated aromatic phosphonic acid such as the homologous series of from the monomethyl ester of para-vinyl benzylphosphonic acid through the monoeicosyl ester of para-vinyl benzylphosphonic acid, the monophenyl ester of meta-isopropenyl benzylphosphonic acid, the mononaphthyl ester of para-vinyl benzylphosphonic acid, the monomethyl ester of P-(4-vinyl-naphthyl-1-methyl)phosphonic acid, the monomethyl ester of P-(4-vinyl-anthracyl-1-methyl)-phosphonic acid, etc.;

(3) A diester of an ethylenically unsaturated aromatic phosphonic acid such as the homologous series of from the dimethyl ester of para-vinyl benzylphosphonic acid through the dieicosyl ester of para-vinyl benzylphosphonic acid, the diphenyl ester of ortho-vinyl benzylphosphonic acid, the dimethyl ester of P-(4-vinyl-naphthyl-1-methyl) phosphonic acid, the dimethyl ester of P-(10-vinyl-anthracyl-9-methyl)phosphonic acid, etc.;

(4) An ethylenically unsaturated aromatic phosphinic acid such as the homologous series of from para-vinyl benzyl ethylphosphinic acid through para-vinyl benzyl eicosylphosphinic acid, meta-isopropenyl benzyl phenylphosphinic acid, para-vinyl benzyl naphthylphosphinic acid, P-methyl-P-(6-vinyl-naphthyl-1-methyl) phosphinic acid, P-phenyl-P-(4-isopropenyl-naphthyl-1-methyl)-phosphinic acid, P-ethyl-P-(10-vinyl-anthracyl-9-methyl)-phosphinic acid, etc.; or (5) An ester of an ethylenically unsaturated aromatic phosphinic acid such as the homologous series of from the methyl ester of para-vinyl benzyl ethylphosphinic acid through the eicosyl ester of para-vinyl benzyl ethylphosphinic acid, the phenyl ester of meta-vinyl benzyl phenylphosphinic acid, the methyl ester of P-methyl-P-(4-vinyl-naphthyl-1-methyl)phosphinic acid, etc.

The ethylenically unsaturated aromatic phosphonic acids, the monoesters thereof, and the ethylenically unsaturated aromatic phosphinic acids employed may be prepared as described in copending application S.N. 16, filed January 4, 1960, now U.S. Patent No. 3,051,742. The diesters of the ethylenically unsaturated aromatic phosphonic acids and the esters of the ethylenically unsaturated aromatic phosphinic acids may be prepared as described in copending application S.N. 15, filed January 4, 1960.

The novel ethylenically unsaturated aromatic phosphorus halides of this invention correspond to the general formula:

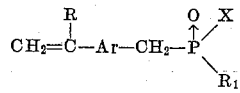

wherein R and Ar are radicals as hereinbefore described, X is a halogen radical and $R_1$ may be either a halogen radical or a hydrocarbon radical free of ethylenic and acetylenic unsaturation and containing from 1 to 20 carbon atoms. Thus, are included as $R_1$ such aliphatic groups as, e.g., methyl, ethyl, propyl, butyl, hexyl, octyl, isooctyl, decyl, dodecyl, eicosyl, etc., and such aromatic groups as phenyl, naphthyl, anthryl, acenaphthyl, tolyl, biphenyl, etc.

The above products are prepared by coreacting an ethylenically unsaturated aromatic phosphorus compound of the species heretofore set forth with a thionyl halide or a phosphorus pentahalide at a temperature of from 0 to 120° C. Although not necessary, the reaction may be effected in the presence of an inert organic solvent such as dioxane, tetrahydrofuran, carbon tetrachloride, benzene, toluene, etc. The reaction system should be kept substantially free of water at all times to avoid possible hydrolysis of the halogenated product.

Considering the process in greater detail; substantially 1 molar proportion of thionyl halide or phosphorus pentahalide is employed for each equivalent proportion of $OR_2$ groups (heretofore described) present in the ethylenically unsaturated aromatic phosphorus compound. Examples of suitable thionyl halides and phosphorus pentahalides include thionyl chloride, thionyl bromide, thionyl iodide, thionyl fluoride, phosphorus pentachloride, phosphorus pentabromide, phosphorus pentaiodide and phosphorus pentafluoride. The reaction proceeds smoothly at temperatures in the range of from 0 to 120° C. However, at reaction temperatures above 50° C., a stoichiometric proportion of an alkali metal, or alkaline earth metal, carbonate or bicarbonate should be employed to preclude hydrohalogenation of the ethylenically unsaturated groups. Examples of such include sodium carbonate, sodium bicarbonate, potassium carbonate, calcium carbonate, etc.

Recovery of the ethylenically unsaturated aromatic phosphorus halides produced may be accomplished employing conventional techniques. The liquid products are recovered by distillation after a previous filtration to remove inorganic salts, if any, present in the final reaction mixture. The solid products are recovered by crystallization from, e.g., acetone, etc.

The products of this invention range from viscous fluids to crystalline solids. As a class, these compounds have been found to be flame-resistant. In one application they may be homopolymerized, or interpolymerized with other vinyl or vinylidene monomers, e.g., styrene, acrylic esters, acrylonitrile, etc., to provide novel flame-resistant polymers. The homopolymers may be cast as flame-resistant surface coatings or laminates on, e.g., wood, glass, metal, refractories, etc., and subsequently cross-linked by using glycols, diamines, etc.

In another application, these ethylenically unsaturated aromatic phosphorus halides may be used as chemical intermediates in the synthesis of other novel ethylenically unsaturated aromatic phosphorus compounds. For example, they may be reacted with amino compounds to form the corresponding phosphorus amides as disclosed in copending application, S.N. 15,252, filed March 16, 1960, now issued as U.S. 3,075,011.

*Example VII*

Fifteen grams of the para-vinyl benzylphosphonyl chloride prepared in Example I and 0.1 gram of ditertiary-butyl peroxide are charged to a reaction tube and placed under an inert atmosphere. The reaction mixture is heated at about 85° C. for 15 hours to produce a hard, transparent polymer which is found by infrared spectroscopy and elemental analysis to be comprised of a plurality of recurring structural units of the formula:

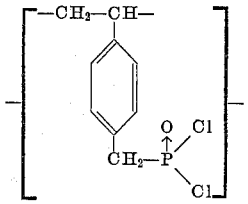

*Example VIII*

Five grams of the para-vinyl benzylphosphonyl chloride polymer prepared in Example VII are dissolved in 10 ml. of hot acetone. The resulting solution is cast on a clean steel plate in a uniform 0.005″ film which film is then dried by heating in hot air oven at 50° C. for 15 minutes. The hard film is then painted with ethylene glycol and let stand at room temperature for 15 minutes. The result is a tough, transparent cross-linked film impervious to water, acetone, alcohol, 10% caustic solution and detergent. Testing for flammability by holding the coated steel plate vertically in the flame of a Meeker burner until the coating is ignited, the coating is found to be self-extinguishing.

It is obvious that many variations may be made in the products and processes set forth above without departing from the spirit and scope of this invention.

What is claimed is:

1. An ethylenically unsaturated aromatic phosphorus acid halide corresponding to the general formula:

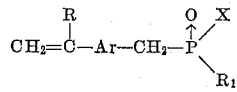

wherein R is a radical selected from the group consisting of hydrogen and methyl, Ar is selected from the class consisting of aromatic hydrocarbon radicals containing from 6 to 14 carbon atoms, X is a halogen radical and $R_1$ is a radical selected from the group consisting of halogen radicals and hydrocarbon radicals free of ethylenic and acetylenic unsaturation containing from 1 to 20 carbon atoms.

2. Vinyl benzylphosphonyl chloride.
3. Isopropenyl benzyl methylphosphinyl bromide.
4. P-phenyl-P(4-vinyl-naphthyl-1-methyl) phosphinyl chloride.

References Cited in the file of this patent

UNITED STATES PATENTS 2,980,721     McMaster et al. _____ Apr. 18, 1961